Dec. 14, 1926.

C. T. ALLCUTT

MEASURING INSTRUMENT

Filed July 7, 1920

1,610,227

INVENTOR
Chester T. Allcutt

Patented Dec. 14, 1926.

1,610,227

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

Application filed July 7, 1920. Serial No. 394,454.

My invention relates to measuring systems and particularly to means for, and methods of, measuring the phase-sequence components of an electrical quantity.

One object of my invention is to provide a device for indicating the positive and negative phase-sequence component of the voltage on a polyphase electric circuit.

Another object of my invention is to provide a measuring device, of the above indicated character, that shall be simple and inexpensive to construct from standard apparatus.

My invention is in the nature of an improvement upon that disclosed in U. S. Letters Patent, No. 1,535,593, issued April 28, 1925, upon an application filed by C. L. Fortescue, L. W. Chubb and J. Slepian, disclosing means whereby an unbalanced polyphase quantity may be separated into a plurality of balanced quantities.

My invention involves the broad principle of the above mentioned application but greatly simplifies the device whereby the desired results may be obtained.

In practicing my invention, I provide a polyphase induction motor which is so connected to a polyphase circuit as to be operated on single phase only. When the motor operates, it generates equal voltages in its various polyphase windings and the difference between the line voltage and the generated voltage is a measure of the positive or negative phase-sequence component, depending upon the direction of rotation of the motor. In order to determine this difference in voltage, a voltmeter is connected between the idle phase winding of the motor and the remaining phase of the circuit.

Figure 1:
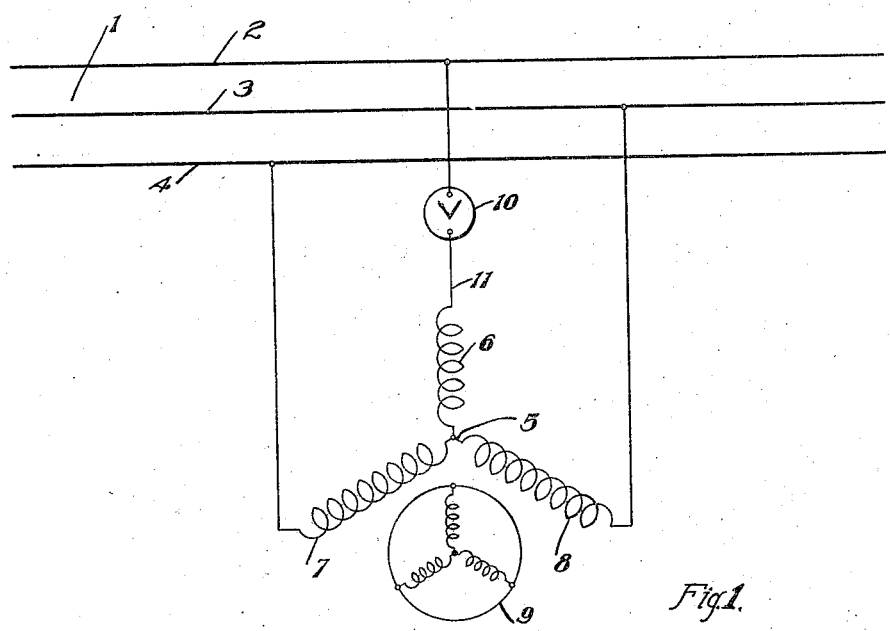
Figure 2:
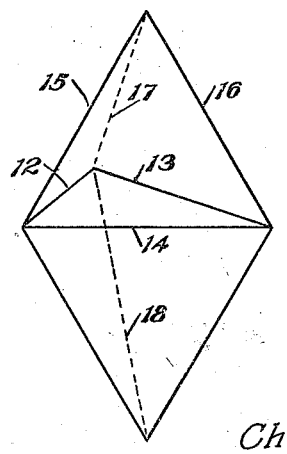

Figure 1 of the accompanying drawings is a diagrammatic view of the measuring device embodying my invention, and Fig. 2 is a diagram illustrating the relation of the various electrical quantities involved in the invention.

A three-phase circuit 1 comprises conductors 2, 3 and 4 across which is impressed an unbalanced voltage or which is traversed by such an unbalanced load that the voltage thereacross is unbalanced. It is desired to determine the various phase-sequence components of the voltage which may be called a measure of the unbalance of the circuit electromotive force. A polyphase motor 5, having three star-connected windings 6, 7 and 8 and a rotor 9, is so connected to the circuit 1 that the windings 7 and 8 are series connected across the conductors 3 and 4. The winding 6 is connected, through a voltmeter 10, to the conductor 2.

With the arrangement as shown, the rotor 9 is operated as the rotor of a single-phase motor and induces equal voltages in the windings 6, 7 and 8. The difference in potential between the point 11 of the winding 6 and the conductor 2 is a measure of the negative phase-sequence component of the unbalanced voltage impressed on the circuit 1. If the rotor 9 is rotated in the opposite direction, the meter 10 will indicate the positive phase-sequence component of the voltage impressed across the circuit 1. Opposite rotation of the motor may be obtained by bringing the motor up to synchronous speed manually in the other direction or the same result may be obtained by temporarily reversing the connection of the windings 7 and 8 to the conductors 3 and 4 until the motor has come up to speed and then reconnecting the motor as shown.

For approximate results, an ordinary induction motor having uniform windings 6, 7 and 8 may be used but, if very accurate results are desired, the winding 6 must be of a less number of turns than the windings 7 and 8 in order that the voltages induced therein may be exactly balanced when the motor is running unloaded.

In Fig. 2 of the drawings, the lines 12, 13 and 14 represent the voltages impressed on the circuit 1. It will be seen that these voltages are unbalanced. The voltages represented by the lines 14, 15 and 16 are the voltages generated in the windings 6, 7 and 8 by the rotation of the rotor 9 and the line 17 represents the difference between the generated voltage and the voltages impressed on the circuit 1. In other words, the indication of the meter 10 is a measure of the line 17 indicated in Fig. 2 of the drawings. The length of the line 18 is proportional to the positive phase-sequence component and the length of the line 17 is proportional to the negative phase-sequence component of the unbalanced three-phase voltages indicated by the lines 12, 13 and 14.

My invention is not limited to the specific structures illustrated as it may be variously modified without departing from the spirit and scope of the invention, as set forth in the appended claims.

I claim as my invention:

1. The combination with a polyphase electric circuit and a polyphase induction motor, of means for connecting one winding to conductors of one phase of the circuit, and means comprising a voltmeter for connecting another winding of the motor to another phase conductor of the circuit.

2. The combination with a polyphase electric circuit and a polyphase star-connected motor, of means for so connecting two windings thereof across one phase of the circuit as to drive the motor from the circuit, and an electroresponsive device connected between the open phase of the motor and the other phase of the circuit.

3. A measuring device for a polyphase electric circuit comprising a three-phase induction motor, means for connecting two of the phase windings thereof across two conductors of the circuit to cause the motor to operate on a single phase and means for indicating the difference in potential between the remaining phase winding and the other conductor of the circuit.

4. A measuring device for a polyphase electric circuit comprising a three-phase induction motor, means for connecting two of the phase windings thereof across two conductors of the circuit, the third phase being disconnected, and means connected to the motor for indicating the positive or negative phase-sequence component of the voltage of the circuit.

5. A measuring device for a polyphase electric circuit comprising a polyphase motor, means for connecting the motor to the circuit to effect operation of the motor, and means connected between one of the phase windings of the motor and the circuit for indicating one phase-sequence component of the voltage on the circuit.

In testimony whereof, I have hereunto subscribed my name this 24th day of June, 1920.

CHESTER T. ALLCUTT.